US007542870B2

(12) United States Patent
Reimer et al.

(10) Patent No.: US 7,542,870 B2
(45) Date of Patent: Jun. 2, 2009

(54) IMMERSED FUEL LEVEL SENSOR

(75) Inventors: Lawrence B. Reimer, Janesville, WI (US); Gregory P. Murphy, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 401 days.

(21) Appl. No.: 11/365,548

(22) Filed: Feb. 28, 2006

(65) Prior Publication Data

US 2007/0203668 A1 Aug. 30, 2007

(51) Int. Cl.
G01B 7/00 (2006.01)
(52) U.S. Cl. ...................................................... 702/155
(58) Field of Classification Search .................. 702/155
See application file for complete search history.

(56) References Cited

U.S. PATENT DOCUMENTS

| | | | | |
|---|---|---|---|---|
| 4,210,969 A | * | 7/1980 | Massa | ........................ 367/108 |
| 4,815,323 A | * | 3/1989 | Ellinger et al. | ............ 73/290 V |
| 4,868,797 A | | 9/1989 | Soltz | |
| 5,085,077 A | | 2/1992 | Stapleton et al. | |
| 5,184,510 A | * | 2/1993 | Rossman | ................... 73/290 V |
| 5,586,085 A | | 12/1996 | Lichte | |
| 5,760,309 A | | 6/1998 | Maltby et al. | |
| 5,768,939 A | | 6/1998 | Quayle et al. | |
| 5,987,994 A | | 11/1999 | Maltby et al. | |
| 6,279,379 B1 | | 8/2001 | Logue et al. | |
| 6,484,088 B1 | | 11/2002 | Reimer | |
| 6,573,732 B1 | | 6/2003 | Reimer | |
| 6,581,459 B1 | * | 6/2003 | Lichtenfels, II | ........... 73/290 V |
| 6,598,474 B2 | | 7/2003 | Purpura et al. | |
| 6,925,869 B2 | | 8/2005 | Senibi et al. | |
| 7,259,712 B1 | * | 8/2007 | McKeen et al. | ............. 342/124 |

OTHER PUBLICATIONS

PCT/US/62778 International Search Report dated Feb. 14, 2008.

* cited by examiner

*Primary Examiner*—Bryan Bui
*Assistant Examiner*—Aditya Bhat
(74) *Attorney, Agent, or Firm*—Michael Best & Friedrich LLP

(57) ABSTRACT

A level sensor includes a first transducer generating a first signal, a second transducer generating a second signal, and a processor configured to switch operation between a first mode and a second mode. In the first mode, the first transducer generates the first signal and the second transducer senses a reflection of the first signal from a surface. In the second mode, the second transducer generates the second signal and the first transducer senses a reflection of the second signal from a reference target. The processor determines a distance to the surface.

11 Claims, 7 Drawing Sheets

IMMERSED FUEL LEVEL SENSOR

BACKGROUND

Ultrasonic transducers can be used to measure a distance to the surface of a liquid. In some situations, a transducer is positioned at the top of a liquid fuel tank. An ultrasonic signal is generated by the transducer and the time it takes for the signal to travel from the top of the tank to the surface of the fuel, reflect off the surface of the fuel, and return to the transducer is measured. If certain information about the tank is known, such as its volume or dimensions, the time measurement can be used in a calculation to determine how much fuel is in the tank.

A variation of such a fuel or liquid level measurement device or system involves placing a transducer at the bottom of a tank, directed upward toward the liquid's surface. A relatively high-voltage electric signal is sent to a transducer (e.g. a piezo-electric transducer) causing the transducer to change shape and resonate at its natural mechanical frequency (or at a multiple thereof). The mechanical resonance results in a short duration pulse of ultrasonic energy being directed towards the surface of the liquid. The ultrasonic sound wave travels through the liquid and reflects off a vapor/liquid interface due to differing speeds of sound between the vapor and the liquid. A portion of the reflected sound energy returns towards the transducer in the form of an echo. The ultrasonic energy imparted by the returning echo causes the transducer to resonate. In turn, this resonance is converted to a relatively low-voltage signal which is detected by measurement electronics. The time between the transmitted ultrasonic pulse and the received echo is directly proportional to the distance the sound wave traveled through the liquid as expressed in the equation below:

$$\text{Distance} = \text{Speed} \times (\text{Time of Flight})/2$$

Where, Speed is the speed of sound within the fluid and is a function of the temperature and the density of the liquid. The distance can be readily calculated if the speed of sound is known.

SUMMARY

A problem associated with prior measurement devices is that the speed of sound is a function of the medium (e.g., liquid) through which the ultrasonic pulse travels and the temperature of the medium. Thus, it is often necessary to determine the type of medium through which the signal will travel and the temperature of that medium before a measurement can be made.

In one embodiment, the invention provides a level sensor that does not require knowledge of the speed of sound in a medium. The level sensor includes a first transducer configured to generate a first signal and a second transducer configured to generate a second signal. The level sensor also includes a reference target placed a first distance from the first transducer and a second distance from the second transducer, and a processor configured to switch operation between a first mode and a second mode and to receive information from the first and second transducers. In the first mode, the processor is configured to send a control signal to the first transducer to cause the first transducer to generate the first signal, and receive a signal from the second transducer that is based upon a reflection of the first signal from a surface. In the second mode, the processor is configured to send a control signal to the second transducer to cause the second transducer to generate the second signal, and receive a signal from the first transducer that is based upon a reflection of the second signal from the reference target. The processor is further configured to determine a distance to the surface based on information related to the reflection of the first signal from the surface and the reflection of the second signal from the reference target.

In another embodiment, the invention provides a method of detecting a surface. In a first mode, the method includes generating a first signal, sensing a first reflection signal from the surface in response to generating the first signal, and calculating a first time of flight. In a second mode, the method includes generating a second signal, sensing a second reflection signal from a reference target in response to generating the second signal, and calculating a second time of flight. The method further includes switching between the first mode and second mode, and determining a distance to the surface based on the first time of flight and the second time of flight.

In another embodiment, the invention provides a module for determining a liquid level within a container of an automobile. The module includes a first transducer configured to be submerged within a liquid in the container, and a second transducer configured to be submerged within the liquid in the container. The module also includes a horn having a first end and a second end separated from the first end by a first distance. The horn is positioned to guide ultrasonic impulses, and a controller is configured to control the first transducer and the second transducer in a first mode and a second mode. The controller is also configured to determine a quantity indicative of the liquid level within the container based on a first time of flight and a second time of flight. In the first mode, the controller is configured to generate a first electric signal and receive a second electric signal, the first transducer is configured to generate a first ultrasonic impulse in response to the first electric signal, and the second transducer is configured to sense a first reflected ultrasonic impulse and generate the second electric signal. In the second mode, the controller is configured to generate a third electric signal and receive a fourth electric signal, the second transducer is configured to generate a second ultrasonic impulse in response to the third electric signal, and the first transducer is configured to sense a second reflected ultrasonic impulse and generate the fourth electric signal. The controller is further configured to switch between the first mode and the second mode.

In another embodiment, the invention provides a method for determining a liquid level within a container having a base. The method includes generating a first electric signal with a controller, generating a first ultrasonic impulse within a liquid in the container with a first transducer coupled to the controller, and sensing a second ultrasonic impulse from within the liquid in the container with a second transducer coupled to the controller. The method also includes generating a second electric signal with the second transducer, calculating a first time of flight based on the time the first electric signal is sent to the transducer and the time the second electric signal is received by the controller, and generating a third electric signal with the controller. The method also includes generating a third ultrasonic impulse within the liquid in the container with the second transducer, sensing a fourth ultrasonic impulse from within the liquid in the container with the first transducer, and generating a fourth electric signal with the first transducer. The method also includes calculating a second time of flight based on the time the third electric signal is sent to the transducer and the time the fourth electric signal is received by the controller, and determining a quantity indicative of the liquid level within the container based on the first time of flight and the second time of flight.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
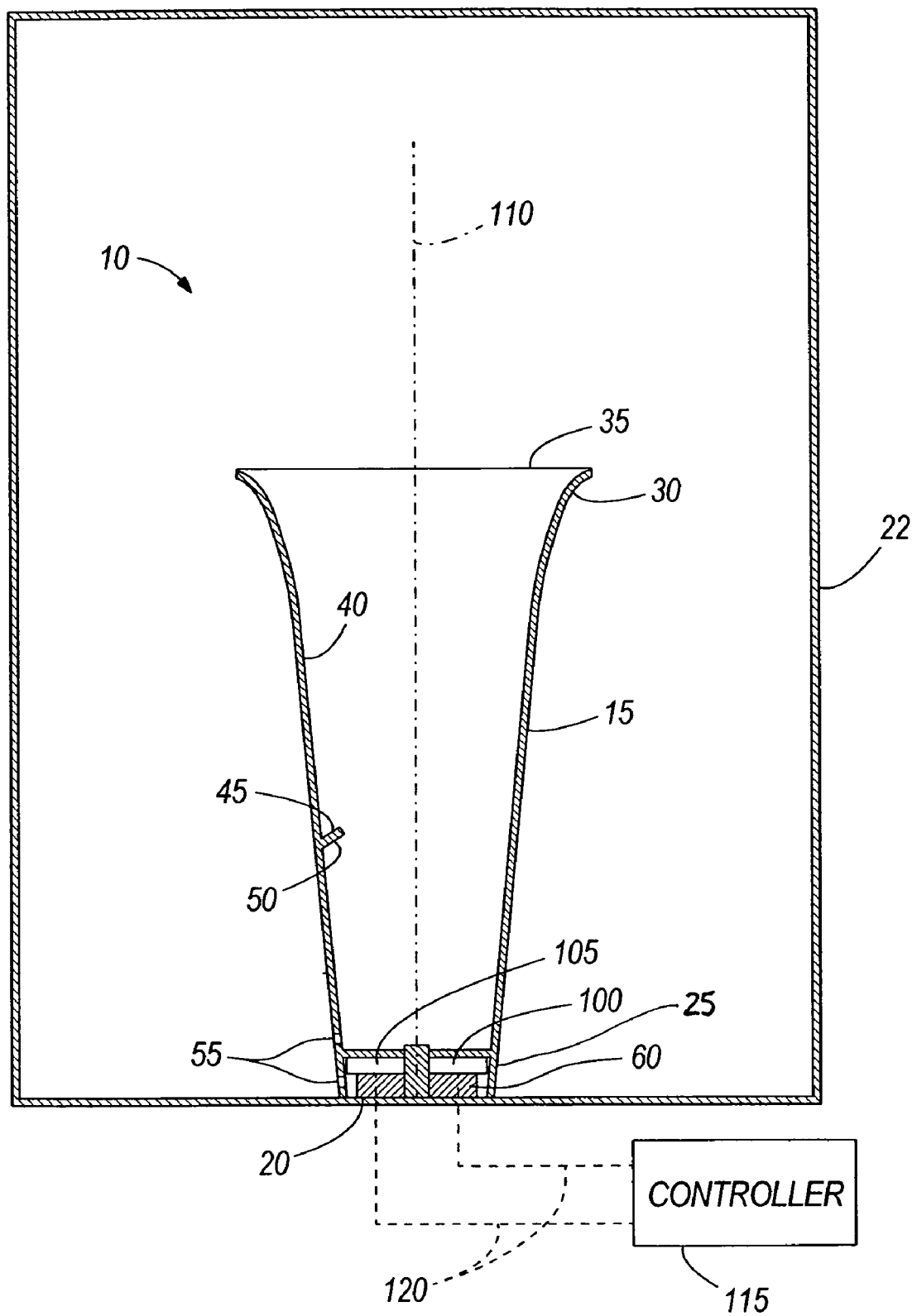
FIG. 1 is a schematic representation of a fuel level sensor.

FIG. 1 is a schematic representation of a fuel level sensor 10 including a horn 15 coupled to a base 20 of a tank 22. Generally, the horn 15 has a flared, tubular shape defining a first end 25 adjacent to the base 20 and a second end 30 defining an opening 35. In the construction shown in FIG. 1, the second end 30 of the horn 15 has a greater diameter than the first end 25.

The horn 15 has an inner wall 40 and a reference target 45 extending therefrom or positioned thereon. The reference target 45 generally includes a reflecting surface 50 forming an angle between about 0° and about 50° with a horizontal plane parallel to the base 20. In some constructions, the reference target 45 extends from the inner wall 40 of the horn 15 forming a ring-like shape within the horn 15. In other constructions, the reference target 45 extends from a section of the inner wall 40 forming a curved protrusion.

Figure 6A:
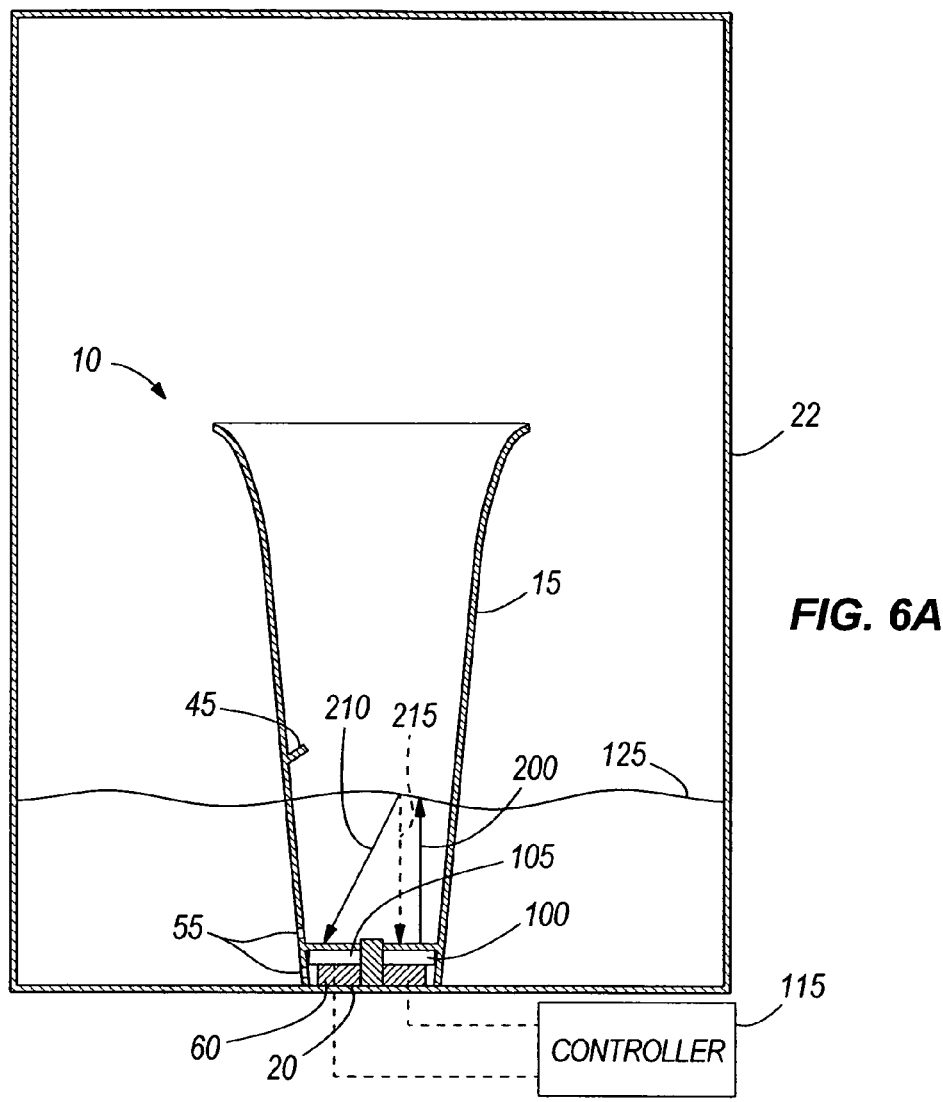
FIG. 6A is the fuel level sensor of FIG. 1 generating a third ultrasonic impulse.
Figure 7A:
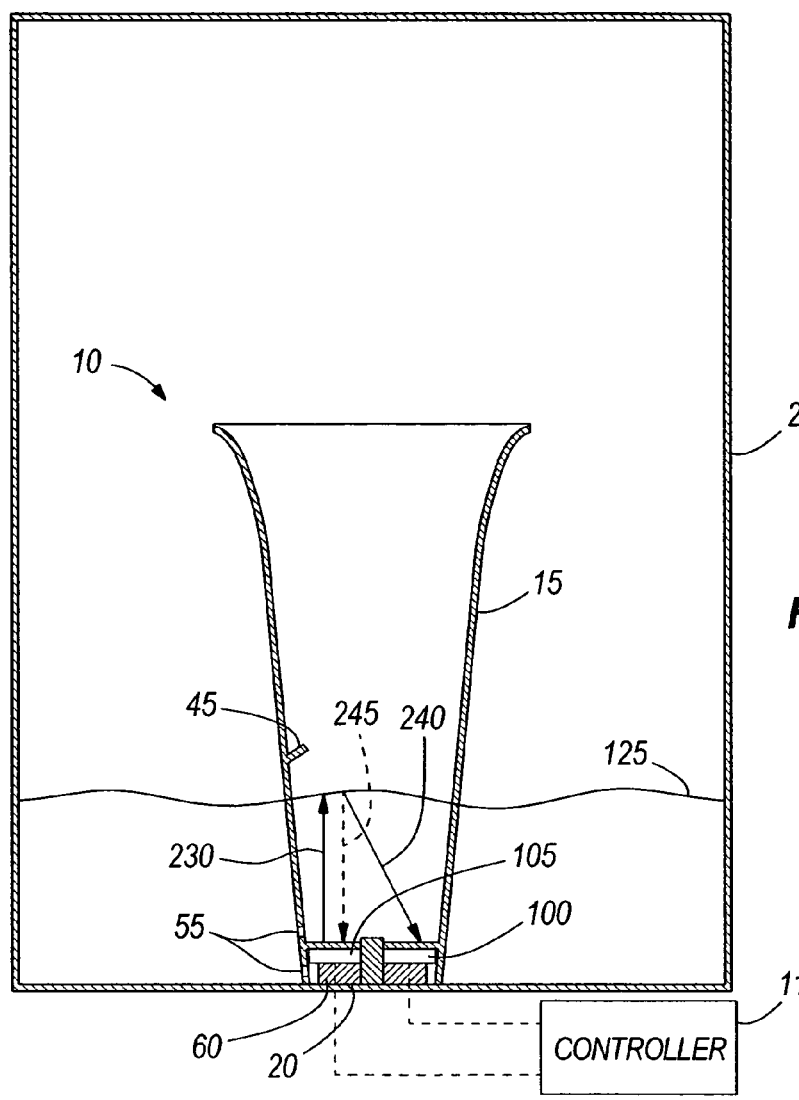
FIG. 7A is the fuel level sensor of FIG. 1 generating a fourth ultrasonic impulse.

The horn 15 also includes vents 55 generally placed near the first end 25 of the horn 15. Each vent 55 defines an aperture that allows for fluids to flow between the inside and outside of the horn 15. For example, in a case when the sensor 10 is partially submerged in a liquid, as shown in FIGS. 6A and 7A, the vents 55 allow liquid to flow between the inside and outside of the horn 15. Thus, the liquid level inside the horn 15 is substantially the same as the liquid level outside the horn 15.

Figure 2A:
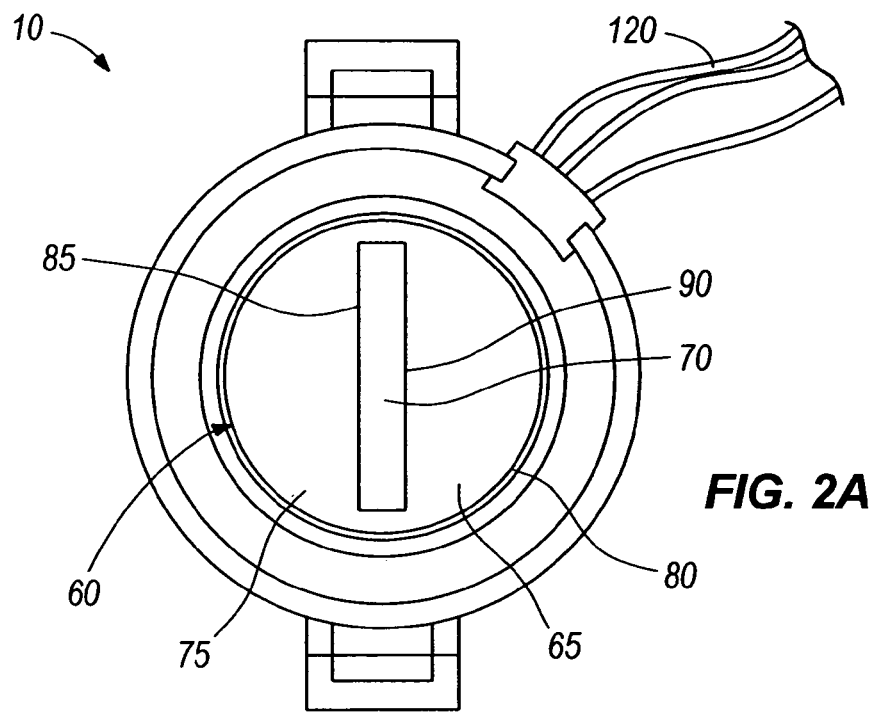
FIG. 2A is a bottom view of the fuel level sensor in FIG. 1.
Figure 2B:
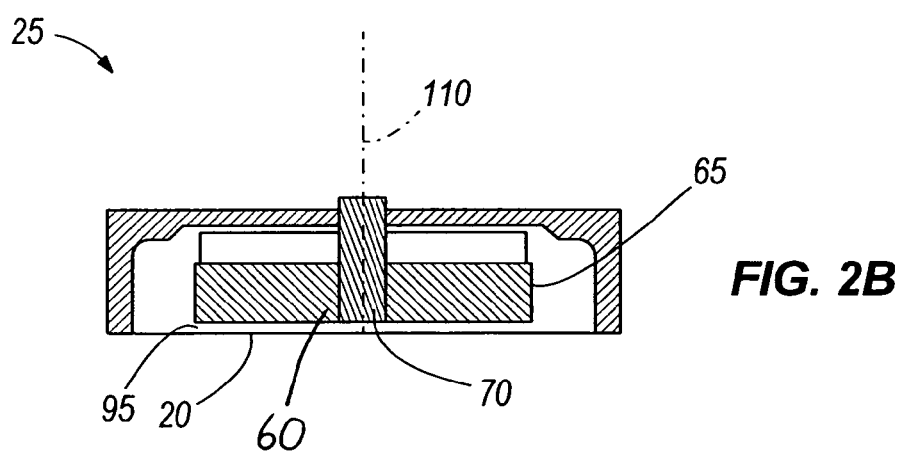
FIG. 2B is a partial cross section of one end the fuel level sensor in FIG. 1.

In reference to FIGS. 1, 2A, and 2B, the fuel level sensor 10 also includes an isolator or damper 60, which in one embodiment is manufactured of foam material. In the construction shown in FIGS. 2A and 2B, the damper 60 includes a first damper piece 65 and a second damper piece 70. FIG. 2A shows a bottom view of one construction of the fuel level sensor 10. As shown in FIG. 2A, the first damper piece 65 includes an outer portion 75 with a substantially circular shape filling an aperture 80 defined by the first end 25 of the horn 15. The first damper piece 65 also includes an inner portion 85 with a rectangular aperture 90. A portion of the second damper piece 70 fits in the aperture 90.

In reference to FIG. 2B, the cross section of the second damper portion 70 defines a rectangular shape and extends from the inside of the horn 15 and through the first damper section 65. In some constructions, the first damper section 65 and the second damper section 70 are in contact with the base 20, as shown in FIG. 1. In the construction shown in FIG. 2B, the first damper portion 65 and the second damper portion 70 are separated from the base 20 by a small gap 95.

Figure 3:
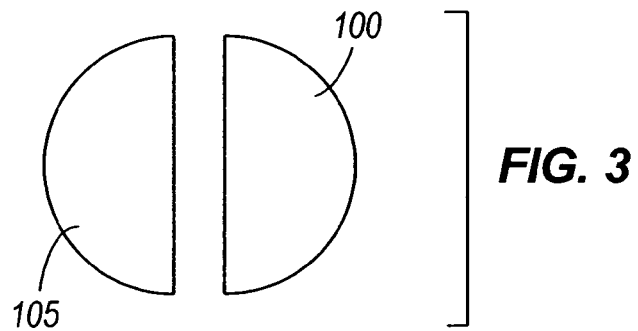
FIG. 3 is a top view of a first transducer and a second transducer of the fuel level sensor of FIG. 1.

In reference to FIG. 1, the fuel level sensor 10 also includes a first transducer 100 and a second transducer 105. The transducers 100 and 10S are placed within the horn 15 adjacent to the first end 25. As shown in FIGS. 1 and 2B, the first transducer 100 is placed at a separation distance from the second transducer 10S defined by the second damper piece 70. Additionally, the first transducer 100 and the second transducer 105 are symmetrically placed with respect to one another and on both sides of the horn 15 defined by a center axis 110. In one construction shown in FIG. 3, the first transducer 100 and the second transducer 105 have a semi-circular shape and are opposed to one another.

The target 45 is positioned a known distance away from each of the first and second transducers 100 and 105. When reflections from the target are received by the transducers and resulting signals sent to the controller (described below), calculations may be carried out using a time of flight measurement for a reflection off the target 45 as a compensating factor for changes in the type of medium or temperature of the medium in which the measurement is made. As noted, such changes can impact the speed of sound.

In reference to FIG. 1, the fuel level sensor 10 also includes a controller 115 electrically connected to the first transducer 100 and the second transducer 105 with wires 120 (also shown in FIG. 2A) or other links. In general, the controller 115 includes instructions to operate the first transducer 100 and the second transducer 105. The controller 115 also receives signals from the first transducer 100 and the second transducer 105 and can process and relay information to other systems based on the interaction with the transducers 100 and 105.

In the construction shown in FIGS. 4-7, the fuel level sensor 10 is configured to determine a distance from the first transducer 100 and the second transducer 105 to a liquid/vapor interphase or surface 125. Particularly, FIGS. 4A, 5A, 6A, and 7A schematically show ultrasonic impulses generated by the transducers 100 and 105 illustrated as solid or dashed lines for ease of analysis. Additionally, FIGS. 4B, 5B, 6B, and 7B each show voltages (sometimes referred to herein as "voltage readings") received over a time period by the controller 115 and generated by the first transducer 100 and the second transducer 105, respectively. As will be further explained, the voltage readings are generated in response to electric signals generated by the controller 115 and in response to the ultrasonic impulses schematically shown in FIGS. 4A, 5A, 6A, and 7A. The voltage readings shown in FIGS. 4B, 5B, 6B, and 7B help better illustrate the operation of the fuel level sensor 10.

Generally, the distance determined by the fuel level sensor 10 is substantially similar to a distance between the base 20 and the surface 125. Thus, the determined distance can be indicative of an actual liquid level. For example, in the particular case when the fuel level sensor 10 is placed within a fuel container (for example, the tank 22) of a motor vehicle, the fuel level sensor 10 is configured to periodically determine the distance between the transducers 100 and 105 and the surface 125. This distance is indicative of the distance between the base 20 and the surface 125 or an actual fuel level. As shown in FIGS. 1-7, the horn 15 is placed to guide ultrasonic impulses generated by the transducers 100 and 105, and guide the reflections of the ultrasonic impulses back to the transducers 100 and 105. The controller 115 can relay the calculated distance or fuel level to a display device to indicate to a vehicle user the amount of fuel within the fuel tank. Other variations of this example can include the controller relaying additional information such as fuel temperature and chemical composition, if appropriate sensors are added to the system and configured to communicate with the controller 115.

Figure 4A:
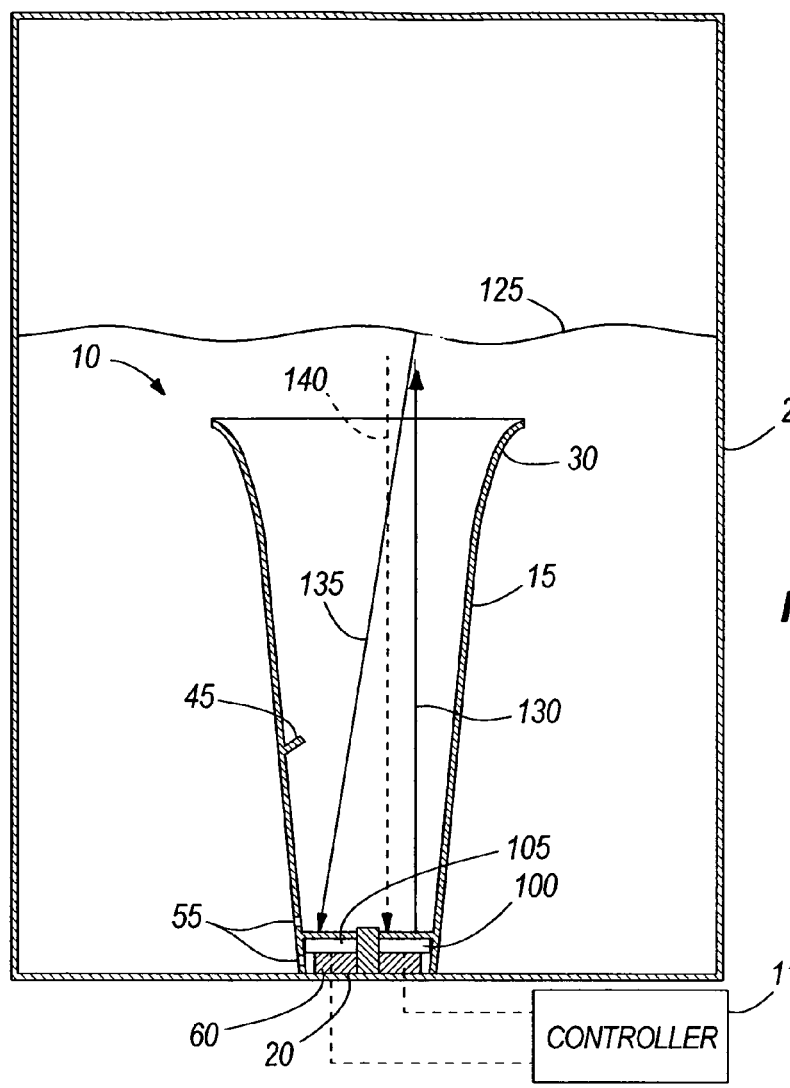
FIG. 4A is the fuel level sensor of FIG. 1 generating a first ultrasonic impulse.
Figure 4B:
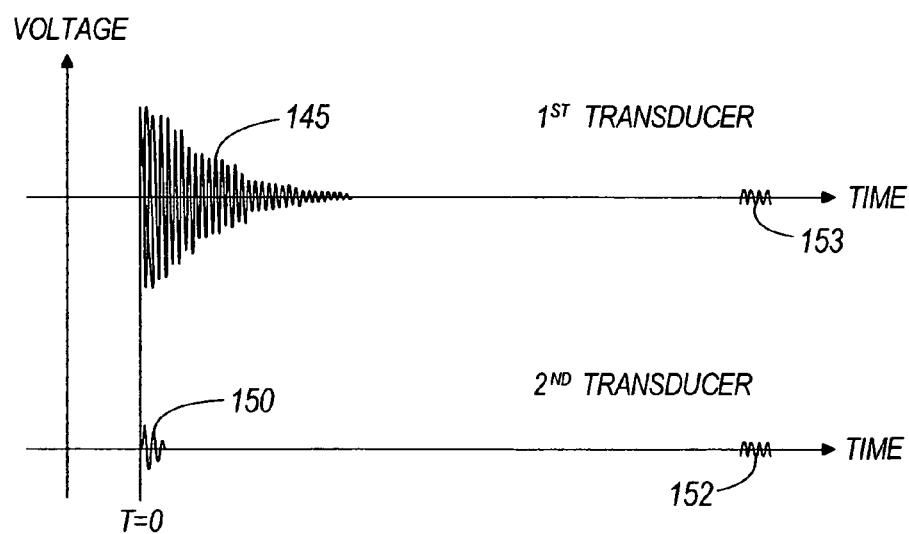
FIG. 4B shows voltage readings indicative of signals illustrated in FIG. 4A.

FIGS. 4A and 4B show the operation of the fuel level sensor 10 in a first mode determined by the controller 115. In the first mode, the controller 115 generates a first control signal to actuate the first transducer 100. The first transducer 100 resonates in response to the first control signal and generates a first ultrasonic impulse 130. The first ultrasonic impulse 130 travels through the horn 15 and reaches the surface 125. The first ultrasonic impulse 130 reflects on the surface 125 and generates a first reflection 135 and a first alternate reflection 140. A voltage reading 145 (FIG. 4B) is indicative of the resonance of the first transducer 100 in response to the first control signal. The voltage reading 145 decreases in amplitude as the transducer 100 returns to an undisturbed or deactive state. The time it takes for the transducers 100 and 105 to return to the deactive state is defined as ring time.

FIG. 4B also shows a voltage reading 150 generated by the second transducer 105. The voltage reading 150 is generally indicative of motion that the first transducer 100 transfers to the second transducer 105. More specifically, the resonance of the first transducer 100 generates motion of the second transducer 105, and the second transducer 105 generates what is referred to as a "phantom" electric signal (voltage reading 150) read or received by the controller 115. In the embodiments shown in FIGS. 1-7, the damper 60 helps reduce the influence of the transducers 100 and 105 on each other due to resonance. Thus, the damper 60 helps reduce the magnitude and length of the voltage reading 150 and increases the ability of the controller 115 to receive electric signals generated by the transducers 100 and 105 in shorter periods of time relative to the ring time.

The controller 115 receives voltage readings 152 and 153 (FIG. 4B) as a consequence of the second transducer 105 and the first transducer 100 sensing the first reflection signal 135 and the first alternate reflection 140, respectively. Based on the time difference between the beginning of voltage readings 145 and 152 (at T=0), the controller 115 calculates a first time of flight. The first time of flight is indicative of the time it takes an ultrasonic impulse to travel from the first transducer 100 to the surface 125 and back to the second transducer 105 as a reflection of the ultrasonic impulse. In the process of calculating the first time of flight, the controller 115 ignores the voltage readings 150 and 153.

Figure 5A:
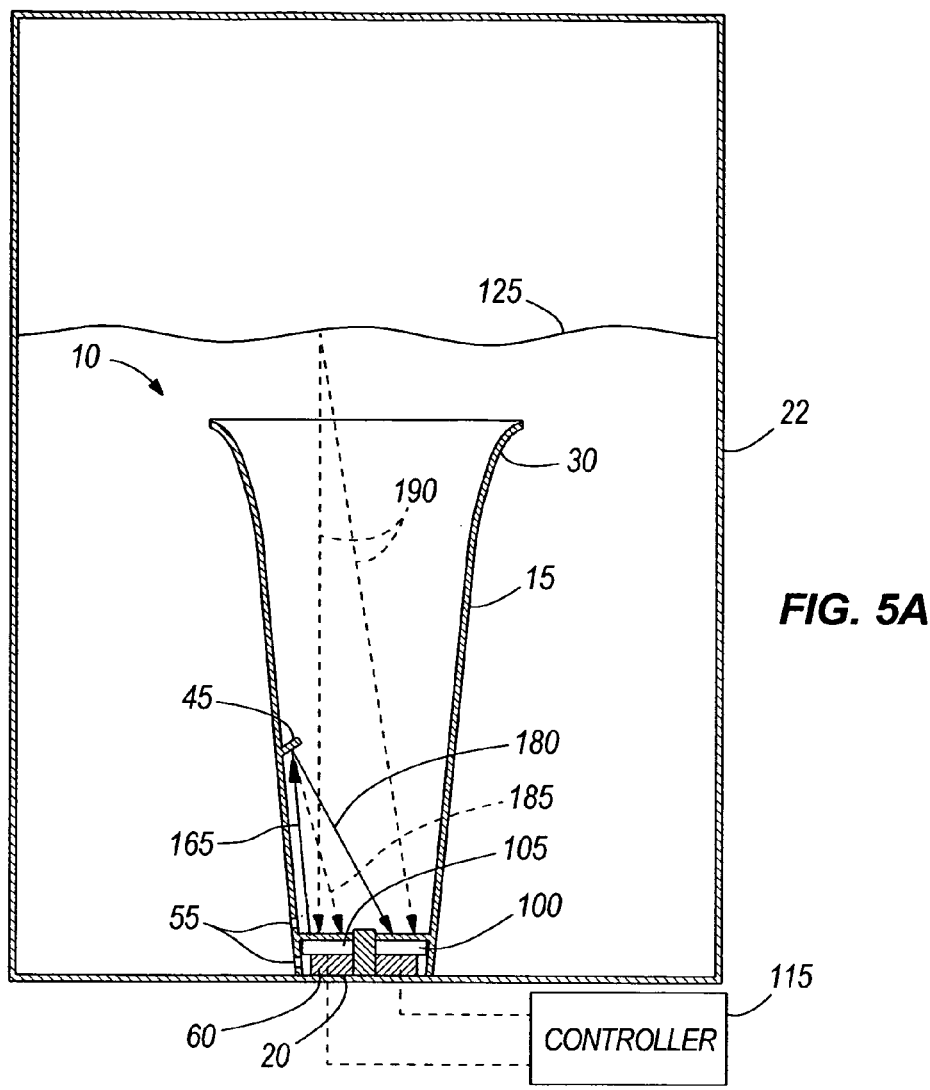
FIG. 5A is the fuel level sensor of FIG. 1 generating a second ultrasonic impulse.
Figure 5B:
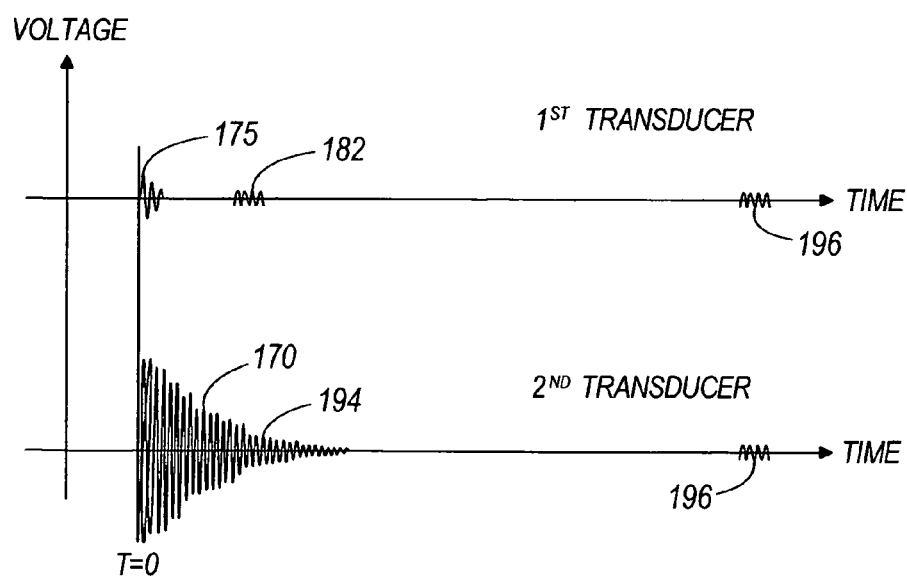
FIG. 5B shows voltage readings indicative of signals illustrated in FIG. 5A.

FIGS. 5A and 5B show the operation of the fuel level sensor 10 in a second mode determined by the controller 115. In the second mode, the controller 115 generates a second control signal to actuate the second transducer 105. The second transducer 105 resonates in response to the second control signal and generates a second ultrasonic impulse 165 and a voltage reading 170. As a consequence of the second transducer 105's resonance, the first transducer 100 generates a phantom electric signal (voltage reading 175) received by the controller 115. The second ultrasonic impulse 165 travels within the horn 15 and reflects off the reference target 45, generating a second reflection signal 180 and at least a second alternate reflection 185. The first transducer 100 and the second transducer 105 also generate electric signals (voltage readings 182 and 194 in FIG. 5B) in response to receiving ultrasonic impulses 180 and 185, respectively.

As shown in FIG. 5B, because the ring time of the voltage reading 170 is greater than the time between generating the second ultrasonic impulse 165 and sensing the second alternate reflection 185 with the second transducer 105, the voltage reading 194 is received by the controller 115 as part of the voltage reading 170. The second ultrasonic impulse 165 also generates surface reflections 190 sensed by the transducers 100 and 105 (voltage readings 196). In the second mode, the controller 115 calculates a second time of flight based on the time between the beginning of voltage reading 170 and voltage reading 182 (at T=0). In the process of calculating the second time of flight, the controller 115 ignores voltage readings 170, 175, 194, and 196.

Additionally, the controller 115 compares the first time of flight, calculated in the first mode, and the second time of flight to determine whether a condition, such as the first time of flight being greater than the second time of flight, is met. In the case shown in FIGS. 4-5, the first time of flight is greater than the second time of flight because the first ultrasonic impulse 130 and the first reflection 135 travel a greater distance than the second ultrasonic impulse 165 and the second reflection 180. Thus, the condition is met, the controller 115 records the second time of flight, and the controller 115 uses the first time of flight and the second time of flight to calculate the distance to the surface 125.

Figure 6B:
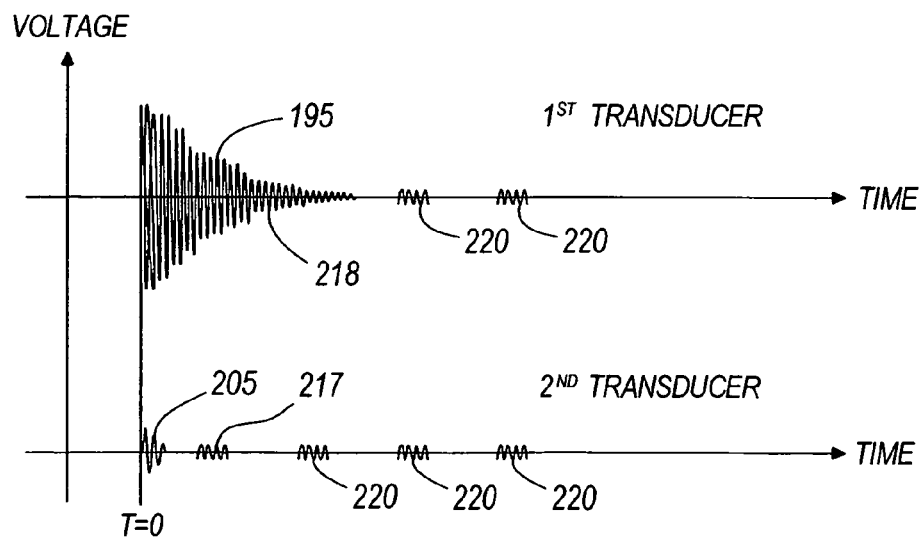
FIG. 6B shows voltage readings indicative of signals illustrated in FIG. 6A.

FIGS. 6-7 schematically show the operation of the fuel level sensor 10 in the case when the surface 125 is located at or below the reference target 45. More specifically, FIGS. 6A and 6B schematically show the operation of the fuel level sensor 10 in the first mode determined by the controller 115. In the first mode, the controller generates a third control signal to actuate the first transducer 100. The first transducer 100 resonates in response to the third control signal and generates a voltage reading 195 and a third ultrasonic impulse 200. As a consequence of the first transducer 100's resonance, the second transducer 105 generates a phantom electric signal (voltage reading 205) received by the controller 115. The third ultrasonic impulse 200 travels within the horn 15 and reflects off the surface 125, generating a third reflection signal 210 and at least a third alternate reflection 215. The second transducer 105 and the first transducer 100 also generate electric signals (voltage readings 217 and 218) in response to receiving ultrasonic impulses 210 and 215, respectively.

Because the ring time of the voltage reading 195 is greater than the time between generating the third ultrasonic impulse 200 and sensing the third alternate reflection 215, the voltage reading 218 is received by the controller 115 as part of the voltage reading 195. The third ultrasonic signal 200 can also generate additional reflections (voltage readings 220) sensed by the transducers 100 and 105. In the first mode, the controller 115 calculates the first time of flight based on the time between the beginning of voltage reading 195 and voltage reading 217 (at T=0). In the process of calculating the first time of flight, the controller 115 ignores voltage readings 195, 205, 218, and 220.

Figure 7B:
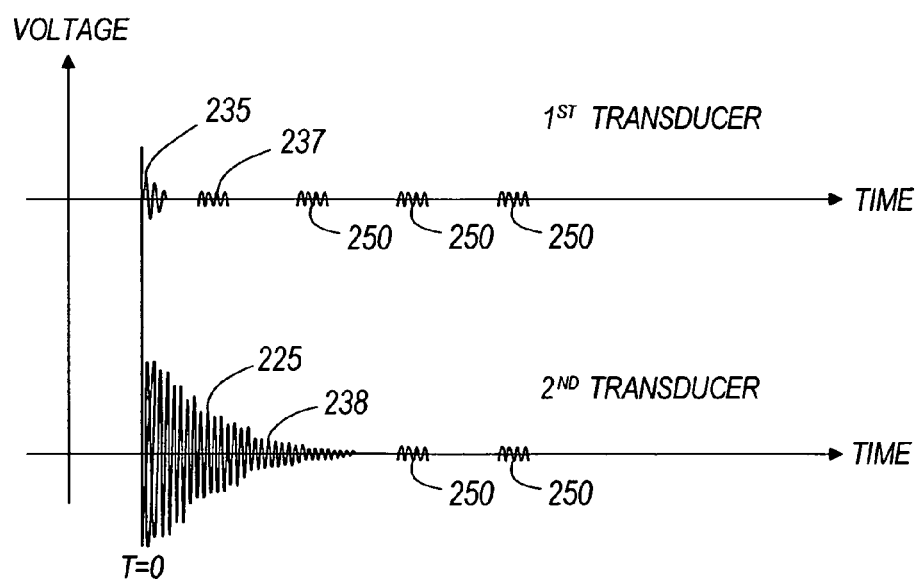
FIG. 7B shows voltage readings indicative of signals illustrated in FIG. 7A.

FIGS. 7A and 7B schematically show the operation of the fuel level sensor 10 in the second mode determined by the controller 115. In the second mode, the controller generates a fourth control signal to actuate the second transducer 105. The second transducer 105 resonates in response to the fourth control signal and generates a voltage reading 225 and a fourth ultrasonic impulse 230. As a consequence of the second transducer 105's resonance, the first transducer 100 generates a phantom electric signal (voltage reading 235) received by the controller 115. The fourth ultrasonic impulse 230 travels within the horn 15 and reflects off the surface 125, thus generating a fourth reflection signal 240 and at least a fourth alternate reflection 245. The first transducer 100 and the second transducer 105 also generate electric signals (voltage readings 237 and 238) in response to receiving ultrasonic impulses 240 and 245, respectively.

Because the ring time of the voltage reading 225 is greater than the time between generating the fourth ultrasonic impulse 230 and sensing the fourth alternate reflection 245, the voltage reading 238 is received by the controller 115 as part of the voltage reading 225. The fourth ultrasonic signal 230 can also generate additional reflections (voltage readings 250) sensed by the transducers 100 and 105. In the second mode, the controller 115 calculates the second time of flight based on the time between the beginning of voltage readings 225 and 237 (at T=0). In the process of calculating the second time of flight, the controller 115 ignores voltage readings 225, 235, 238, and 250.

Additionally, the controller 115 compares the first time of flight, calculated in the first mode, and the second time of flight to determine whether the condition, such as the first time of flight being greater than the second time of flight, is met. In the case shown in FIGS. 6-7, the first time of flight is substantially equal to the second time of flight because both the third ultrasonic impulse 200 and the fourth ultrasonic impulse 230 reflect off the surface 125. Thus, the condition is not met and the controller 115 uses a previously recorded second time of flight to calculate the distance to the surface 125.

Figure 8:
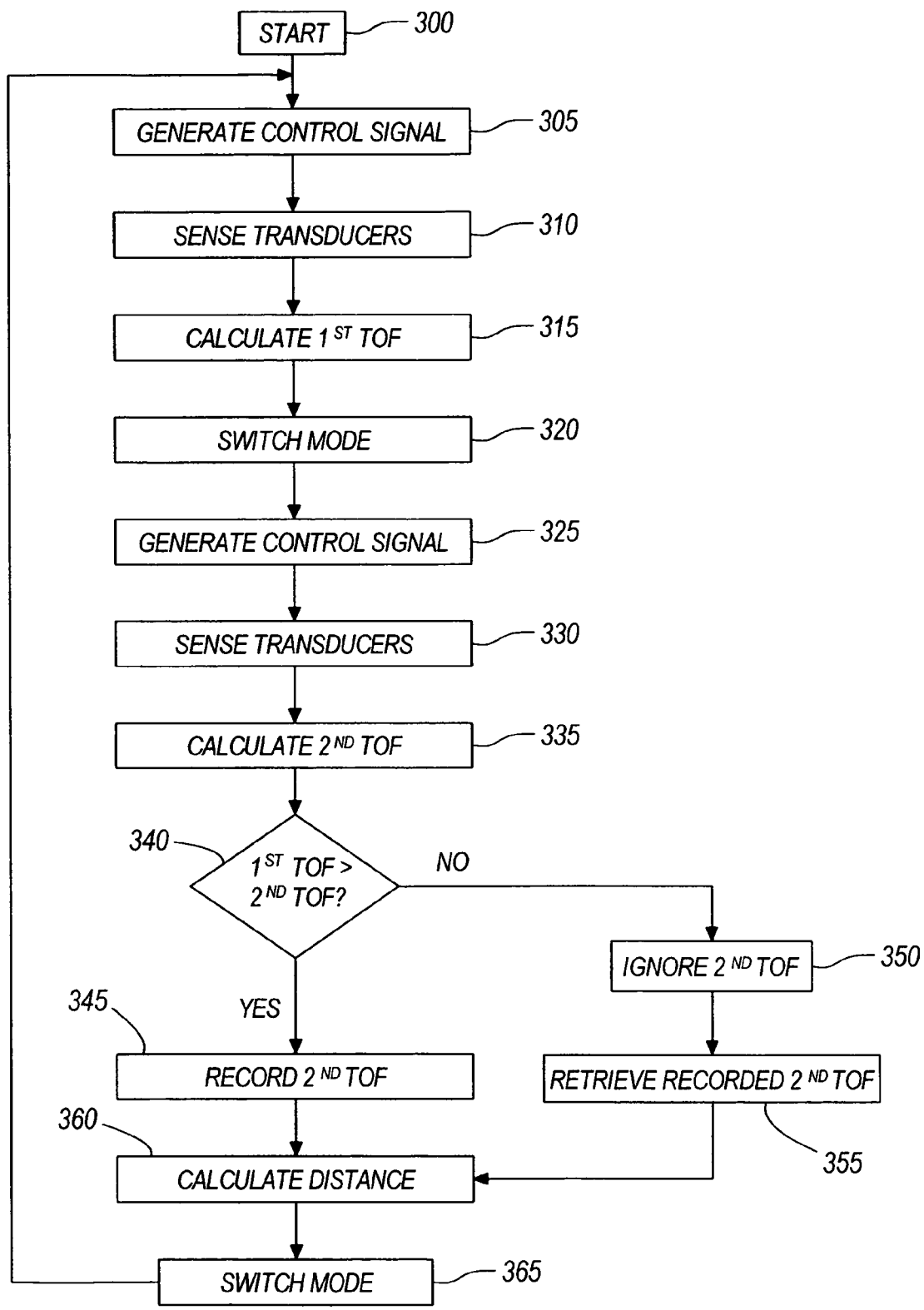
FIG. 8 is a flow chart illustrating the operation of the fuel level sensor of FIG. 1.

FIG. 8 shows a flow chart at least partially illustrating a procedure to operate the fuel level sensor 10. In the procedure shown in FIG. 8, the fuel level sensor 10 is configured to determine a distance to the surface 125 regardless of the composition, level, or temperature of the liquid. The fuel level sensor 10 starts operation (at step 300), under the first mode. For example, step 300 might be initiated when the engine of a vehicle including the fuel tank is started. Alternatively, the fuel level sensor 10 can be started independently in cases when it is not placed in a vehicle.

The controller 115 generates a first control signal (at step 305) to actuate the first transducer 100. The first transducer 100 generates a first ultrasonic impulse as a consequence of receiving the first control signal. The controller 115 receives electric signals (at step 310) generated by the transducers 100 and 105. As previously explained, the electric signals received by the controller 115 are generated by the transducers 100 and 105 in response to receiving ultrasonic impulses. The controller 115 calculates the first time of flight (at step 315) taking into account an electric signal generated by the second transducer 105 in response to receiving a reflected ultrasonic impulse. The controller 115 ignores all other signals under the assumption that such signals are representative of subsequent reflections from the first ultrasonic impulse.

The controller 115 switches to a second mode of operation (at step 320). In the second mode, the controller 115 generates a second control signal (at step 325) to actuate the second transducer 105. The second transducer 105 generates a second ultrasonic impulse as a consequence of receiving the second control signal. The controller 115 receives electric signals (at step 330) generated by the transducers 100 and 105, and calculates the second time of flight (at step 335) taking into account an electric signal generated by the first transducer 100 in response to receiving a reflected ultrasonic impulse. The controller 115 ignores all other signals under the assumption that such signals are representative of subsequent reflections from the second ultrasonic impulse.

The controller 115 compares (at step 340) the first time of flight to the second time of flight to check whether the first time of flight is greater than the second time of flight. In the case when the first time of flight is greater than the second time of flight, the controller proceeds to record (at step 345) the second time of flight. In the case when the first time of flight is not greater than the second time of flight, the controller 115 ignores the second time of flight (at step 350) and retrieves a previously recorded and valid second time of flight (at step 355). The controller calculates a distance to the surface 125 (at step 360) according to a formula shown in Eqn. 1.

$$D = Dr \cdot \frac{1^{st}TOF}{2^{nd}TOF} \qquad \text{Eqn. 1}$$

Where D is the distance to the surface 125, Dr is a known distance to the reference target 45, $1^{st}$ TOF is the first time of flight, and $2^{nd}$ TOF is the second time of flight.

The controller 115 switches to the first mode (at step 365) and returns to step 305 to calculate the distance to the surface 125 until a user manually stops the operation of the fuel level sensor 10 or the fuel level sensor 10 stops operating automatically.

Various features and advantages of the invention are set forth in the following claims.

What is claimed is:

1. A module for determining a liquid level within a container of an automobile, the module comprising:
   a first transducer configured to be submerged within a liquid in the container;
   a second transducer configured to be submerged within the liquid in the container;
   a horn having a first end and a second end separated from the first end by a first distance, and positioned to guide ultrasonic impulses; and
   a controller configured to control the first transducer and the second transducer in a first mode and a second mode, and determine a quantity indicative of the liquid level within the container based on a first time of flight and a second time of flight,
   in the first mode, the controller is configured to generate a first electric signal and receive a second electric signal, the first transducer is configured to generate a first ultrasonic impulse in response to the first electric signal, and the second transducer is configured to sense a first reflected ultrasonic impulse and generate the second electric signal, wherein the first reflected ultrasonic impulse is a reflection of the first ultrasonic impulse,
   in the second mode, the controller is configured to generate a third electric signal and receive a fourth electric signal, the second transducer is configured to generate a second ultrasonic impulse in response to the third electric signal, and the first transducer is configured to sense a second reflected ultrasonic impulse and generate the fourth electric signal, wherein the second reflected ultrasonic impulse is a reflection of the second ultrasonic impulse, the controller further configured to switch between the first mode and the second mode.

2. The module of claim 1, further comprising a target placed at a second distance from the first end of the horn, the second distance being smaller than the first distance, and the first and second transducers placed adjacent to the first end.

3. The module of claim 2, wherein the horn has an internal wall and the target is an integral part of the internal wall and extends therefrom.

4. The module of claim 3, wherein the horn includes at least one vent near the first end of the horn.

5. The module of claim 3, wherein the target includes a reflective surface forming an angle between about 0 degrees and about 50 degrees with respect to the base.

6. The module of claim 1, further comprising a damper configured to help reduce the influence of the first transducer on the second transducer and the influence of the second transducer on the first transducer in response to the first and second transducers generating and receiving ultrasonic impulses.

7. The module of claim 6, wherein the damper includes a first piece and a second piece, the first piece filling a first separation space between the first and second transducers and the base of the container, the second piece filling a second separation space between the first transducer and the second transducer.

8. The module of claim 7, wherein the first piece of the damper has a shape substantially similar to an inner surface of the horn and includes a central opening, and the second piece fills the central opening of the first piece.

9. The module of claim 1, wherein the first reflected ultrasonic impulse is a reflection of the first ultrasonic impulse on a liquid/vapor interface.

10. The module of claim 9, wherein the second reflected ultrasonic impulse is a reflection of the second ultrasonic impulse on the target at the second distance from the first end of the horn.

11. The module of claim 10, wherein the controller is further configured to determine a quantity indicative of the first time of flight based on the first electric signal and the second electric signal, and determine another quantity indicative of the second time of flight based on the third electric signal and the fourth electric signal.

* * * * *